US010273396B2

(12) United States Patent
Jung et al.

(10) Patent No.: US 10,273,396 B2
(45) Date of Patent: Apr. 30, 2019

(54) CLAY STABILIZING AND METHODS OF USE WITH QUATERNARY AMMONIUM SALTS

(71) Applicant: RHODIA OPERATIONS, Paris (FR)

(72) Inventors: Chang Min Jung, North Wales, PA (US); Lingjuan Shen, Yardley, PA (US); Jian Zhou, Langhorne, PA (US); Qi Qu, Spring, TX (US)

(73) Assignee: RHODIA OPERATIONS, Paris (FR)

( * ) Notice: Subject to any disclaimer, the term of this patent is extended or adjusted under 35 U.S.C. 154(b) by 0 days.

(21) Appl. No.: 15/416,062

(22) Filed: Jan. 26, 2017

(65) Prior Publication Data

US 2017/0210966 A1    Jul. 27, 2017

Related U.S. Application Data

(60) Provisional application No. 62/287,147, filed on Jan. 26, 2016.

(51) Int. Cl.
| | | |
|---|---|---|
| *C09K 8/035* | (2006.01) | |
| *C09K 8/42* | (2006.01) | |
| *C09K 8/528* | (2006.01) | |
| *C09K 8/60* | (2006.01) | |
| *C09K 8/68* | (2006.01) | |
| *C09K 8/74* | (2006.01) | |
| *C09K 8/80* | (2006.01) | |
| *E21B 21/00* | (2006.01) | |

(52) U.S. Cl.
CPC ............... *C09K 8/035* (2013.01); *C09K 8/42* (2013.01); *C09K 8/528* (2013.01); *C09K 8/602* (2013.01); *C09K 8/68* (2013.01); *C09K 8/74* (2013.01); *C09K 8/80* (2013.01); *E21B 21/00* (2013.01); *C09K 8/605* (2013.01); *C09K 2208/12* (2013.01); *C09K 2208/24* (2013.01); *C09K 2208/26* (2013.01); *C09K 2208/32* (2013.01); *C09K 2208/34* (2013.01)

(58) Field of Classification Search
CPC .......... C09K 8/035; C09K 8/42; C09K 8/528; C09K 8/602; C09K 8/605; C09K 8/74; C09K 8/80; C09K 2208/12; C09K 2208/24; C09K 2208/26; C09K 2208/32; E21B 21/00
USPC .......................................... 175/65
See application file for complete search history.

(56) References Cited

U.S. PATENT DOCUMENTS

| | | | | |
|---|---|---|---|---|
| 2,761,835 | A | * | 9/1956 | Brown ................... C09K 8/607 501/148 |
| 4,447,341 | A |   | 5/1984 | Block |
| 4,476,930 | A | * | 10/1984 | Watanabe ............... C02F 1/042 166/279 |
| 4,580,633 | A | * | 4/1986 | Watkins ................... C09K 8/60 106/900 |
| 5,342,530 | A |   | 8/1994 | Aften et al. |
| 5,558,171 | A |   | 9/1996 | McGlothlin et al. |
| 2006/0081370 | A1 | * | 4/2006 | Fu .......................... C09K 8/602 166/279 |
| 2012/0285689 | A1 |   | 11/2012 | Weaver et al. |

(Continued)

Primary Examiner — Silvana C Runyan

(57) ABSTRACT

Methods of using a clay stabilizing agent to inhibit swelling and/or migration of clay subterranean materials upon exposure to water, wherein the clay stabilizing agent is selected from quaternary ammonium salts according to Formula I, Formula II, Formula III, Formula IV, Formula V, and combinations thereof.

3 Claims, 2 Drawing Sheets

(56) References Cited

U.S. PATENT DOCUMENTS

| | | |
|---|---|---|
| 2014/0190700 A1 | 7/2014 | Tang et al. |
| 2014/0262287 A1 | 9/2014 | Treybig et al. |
| 2014/0262319 A1 | 9/2014 | Treybig et al. |
| 2015/0210913 A1 | 7/2015 | Gupta et al. |
| 2015/0299554 A1 | 10/2015 | Pakulski et al. |

* cited by examiner

CLAY STABILIZING AND METHODS OF USE WITH QUATERNARY AMMONIUM SALTS

CROSS-REFERENCE TO RELATED APPLICATION

The present application claims the benefit of priority under 35 U.S.C. § 119(e) of U.S. Provisional Application Ser. No. 62/287,147, filed on Jan. 26, 2016, the entire disclosure of which is incorporated herein by reference.

BACKGROUND

The production of hydrocarbons from subterranean formations is often effected by the presence of clays and other fines which can migrate and plug off or restrict the flow of the hydrocarbon product. The migration of fines in a subterranean formation is often the result of clay swelling, salt dissolution, and/or the disturbance of fines by the introduction of fluids that are foreign to the formation. Typically, such foreign fluids (e.g. drilling fluid, fracturing fluid or stabilizing fluid) are introduced into the formation for the purpose of completing and/or treating the formation to stimulate production of hydrocarbons by, for example, drilling, fracturing, acidizing, or stabilizing the well.

Attempts to diminish the damaging effects caused by introduction of the foreign fluid and the swelling and migration of the components of the formations has included the addition of one or more various shale hydration inhibitors and/or stabilizing agents into such foreign fluids. These work on the principle of the substitution of a cationic species in the clay lattice for a sodium ion. The cationic species is generally selected such that its radius of hydration is less than that of the sodium ion. It is believed that the molecules of the shale hydration inhibitors and stabilizing agents compete with molecules of water for reactive sites. Thus, the possibility of swelling and migration is minimized upon their contact with the formation. As a result, the probability of disintegration of formation is diminished and swelling is inhibited.

Potassium chloride has been widely used as a shale inhibitor/clay stabilizer. In stimulation methods, potassium chloride has often been used as a preflush and/or added to aqueous stimulation methods in order to convert the clay to a less swellable form. While such salts diminish the reduction of formation permeability, they are often detrimental to the performance of other constituents of the foreign fluid. Such salts further produce high chloride levels which are environmentally unacceptable. Choline chloride has also been utilized as a clay stabilizer, but provides only temporary clay protection and can get washed away during subsequent acid or fresh water ingression. Improvements in this field of technology are desired.

SUMMARY

In certain embodiments, there is provided a method of inhibiting the swelling and/or migration of clay subterranean materials during drilling. In other embodiments, there is provided a method of inhibiting the swelling and/or migration of clay subterranean materials encountered during the drilling of a subterranean formation. In additional embodiments, there is provided a method of inhibiting the swelling and/or migration of clay subterranean materials during production. In certain embodiments, there is provided a method of extracting oil from an oil-containing subterranean formation. In some embodiments, the subterranean formation was previously hydraulically fractured and oil was previously extracted.

DETAILED DESCRIPTION

Figure 1:
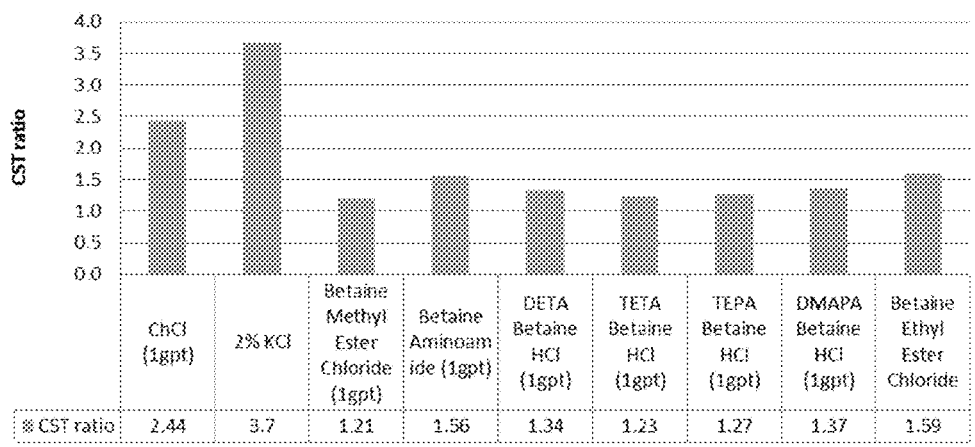
FIG. 1 provides a comparison of CST ratios.

In general, the presently disclosed subject matter relates to methods of using a clay stabilizing agent to inhibit swelling and/or migration of clay subterranean materials upon exposure to water. In an embodiment, the clay stabilizing agent is selected from quaternary ammonium salts according to Formula I

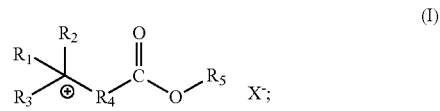

Formula II

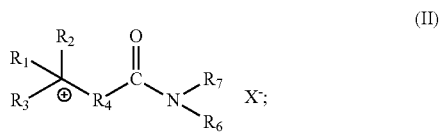

Formula III

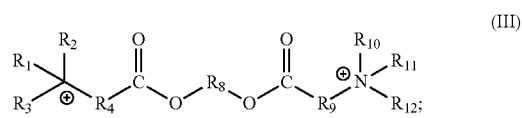

Formula IV

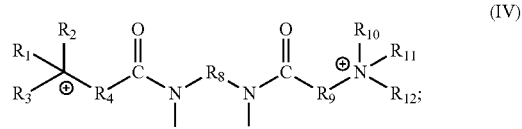

Formula V

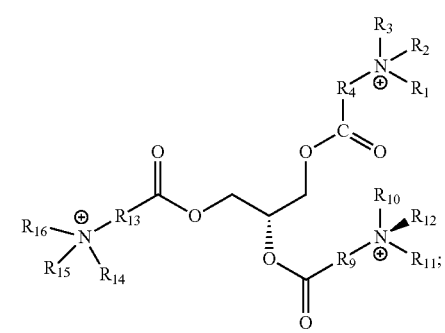

and combinations thereof, wherein for each Formula individually:

$R_1$, $R_2$ and $R_3$ are the same or different and are hydrogen, an alkyl or hydroxyalkyl group of from 1 to about 3 carbon atoms, $R_4$ is a saturated or unsaturated, straight or branched alkyl, hydroxyalkyl or alkoxylated alkyl group of from 1 to about 3 carbon atoms, $R_5$ is a straight chain or branched, aliphatic, olefinic or aromatic, hydrocarbyl or hydroxyalkyl group of from 1 to about 12 carbon atoms, or a mono-amine, di-amine, or polyamine, or a mono-amide, di-amide, or polyamide, $R_6$ and $R_7$ are the same or different and are hydrogen, or a straight chain or branched, aliphatic, olefinic or aromatic hydrocarbyl or hydroxyalkyl group of from 1 to about 12 carbon atoms, or a mono-amine, di-amine, or polyamine, or a mono-amide, di-amide, or polyamide, $R_8$ is a straight chain or branched, aliphatic, olefinic or aromatic, hydrocarbyl or hydroxyalkyl group of from 1 to about 12 carbon atoms, or a mono-amine, di-amine, or polyamine, or a mono-amide, di-amide, or polyamide, $R_9$ and $R_{10}$ are the same or different and are a saturated or unsaturated, straight or branched alkyl, hydroxyalkyl or alkoxylated alkyl group of from 1 to about 3 carbon atoms, $R_{11}$, $R_{12}$, $R_{13}$, $R_{14}$, $R_{15}$, and $R_{16}$ are the same or different and are hydrogen, an alkyl or hydroxyalkyl group of from 1 to about 3 carbon atoms, and $X^-$ is a monovalent inorganic anion or an organic carboxylic acid anion derived from a $C_{2-6}$ carboxylic acid; and combinations thereof.

In an embodiment, the clay stabilizing agent includes a quaternary ammonium salt according to Formula I, wherein $R_5$ is a straight chain or branched alkyl or alkenyl group of from 1 to about 12 carbon atoms.

In an embodiment, the clay stabilizing agent includes a quaternary ammonium salt according to Formula II, wherein $R_6$ and $R_7$ are the same or different and are a straight chain or branched alkyl or alkenyl group of from 1 to 12 carbon atoms.

As used herein, the term "clay stabilizing formulation" refers to a composition which is capable of delivering the clay stabilizing agent into a subterranean formation. For instance, the clay stabilizing formulation may be utilized with a separate drilling fluid, drill-in fluid, completion fluid, stimulation fluid, fracturing fluid, acidizing fluid, remedial fluid, scale inhibition fluid, circulating fluid, gravel pack fluid or the like or may itself be any of the aforementioned fluids. Such fluids may contain a gelling agent to increase the viscosity of the fluid. The clay stabilizing agent can also be utilized in cementing fluids such as a cement slurry or a cement spacer, in certain illustrative embodiments. In a preferred embodiment, the clay stabilizing agent is entrained within the aqueous fluid. In other embodiments, the clay stabilizing agent can be made available as a solid material without being dissolved or entrained in the aqueous fluid. In certain embodiments, the clay stabilizing formulation exhibits an acidic, alkaline or neutral pH, such as those in the range of from about 1 to 11, and may be utilized with aqueous fluids having an acidic, alkaline or neutral pH.

When combined with an aqueous fluid to render an aqueous clay stabilizing formulation, the clay stabilizing agent is capable of reducing or substantially eliminating damage to the formation caused by the clay subterranean materials. The presence of the clay stabilizing agent eliminates or reduces the tendency of the clay subterranean materials to swell or disintegrated/migrate upon contact with the clay stabilizing formulation.

As a non-limiting example, acidizing is a stimulation technique used to improve production by introducing a solution containing reactive acid into a formation to enlarge passageways and improve permeability. In sandstone formations, the acid enlarges the pores, while in carbonate formations, the acid dissolves the entire matrix. However, acidizing can generate fines which migrate, cause plugging, and reduce the performance of production. Addition of the clay stabilizing formulations of the present disclosure to the acid treatment fluid helps to prevent the fines from migrating and improves the efficiency of the acidizing step.

While specific embodiments are discussed, the specification is illustrative only and not restrictive. Many variations of this disclosure will become apparent to those skilled in the art upon review of this specification.

Unless defined otherwise, all technical and scientific terms used herein have the same meaning as is commonly understood by one of skill in the art to which this specification pertains.

As used in the specification and claims, the singular form "a", "an" and "the" includes plural references unless the context clearly dictates otherwise.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The phrase "subterranean formation" encompasses both areas below exposed earth and areas below earth covered by water, such as an ocean or fresh water.

The term "clay subterranean materials" includes sand and/or clays which swell, disperse, disintegrate or otherwise become disrupted, thereby demonstrating an increase in bulk volume, in the presence of foreign aqueous well treatment fluids, such as drilling fluids, stimulation fluids, gravel packing fluids, etc. The term also includes those sand and/or clays which disperse, disintegrate or otherwise become disrupted without actual swelling. For example, clays which, in the presence of foreign aqueous well treatment fluids, expand and may be disrupted by becoming unconsolidated, thereby producing particles that migrate into a borehole shall also be included by the term.

Clay subterranean materials which may be effectively treated with the clay stabilizer formulation may be of varying shapes, such as, for example, minute, plate-like, tube-like and/or fiber-like particles having an extremely large surface area. Examples include clay minerals of the montmorillonite (smectite) group such as montmorillonite, saponite, nontronite, hectorite and sauconite, the kaolin group such as kaolinite, nacrite, dickite, and halloysite, the hydrousmica group such as hydrobiotite, gluaconite, illite and bramallite, the chlorite group such as chlorite and chamosite, clay minerals not belonging to the above group such as vermiculite, attapulgite and sepiolite and mixedlayer varieties of such clay minerals and groups. Other mineral components may be further associated with the clay, such as, but not limited to, silica, iron minerals, alkaline earth metal carbonates, feldspars, biotite, and mixtures thereof.

In certain embodiments, there is provided a method of inhibiting the swelling and/or migration of clay subterranean materials during drilling. The method includes drilling a borehole with a drilling fluid that includes a clay stabilizing agent selected from quaternary ammonium salts according to Formula I, Formula II, Formula III, Formula IV, Formula V and combinations thereof.

In other embodiments, there is provided a method of inhibiting the swelling and/or migration of clay subterranean materials encountered during the drilling of a subterranean formation. The method includes circulating in the subterranean formation a water-based well treatment fluid that includes an aqueous continuous phase and a clay stabilizing agent selected from quaternary ammonium salts according to Formula I, Formula II, Formula III, Formula IV, Formula V and combinations thereof.

In additional embodiments, there is provided a method of inhibiting the swelling and/or migration of clay subterranean materials during production. The method includes circulating a production fluid through a borehole with a circulating fluid that includes a clay stabilizing agent selected from quaternary ammonium salts according to Formula I, Formula II, Formula III, Formula IV, Formula V and combinations thereof.

In certain embodiments, there is provided a method of extracting oil from an oil containing subterranean formation. The method includes providing through a first borehole, a pressurized water-based well treatment fluid that includes an aqueous continuous phase and a clay stabilizing agent selected from quaternary ammonium salts according to Formula I, Formula II, Formula III, Formula IV, Formula V and combinations thereof, and recovering oil from the subterranean formation through a second borehole. In certain embodiments, the subterranean formation was previously hydraulically fractured and oil was previously extracted.

Generally, the clay stabilizing agent is present in the clay stabilizing formulation in an amount sufficient to reduce either or both of surface hydration based swelling and/or osmotic based swelling of clay subterranean materials. The exact amount of the clay stabilizing agent present in a particular clay stabilizing formulation may be determined by a trial and error method of testing the combination of clay stabilizing formulation and clay formation encountered. In one embodiment, the amount of clay stabilizing agent of the present disclosure used in the clay stabilizing formulation ranges from about 0.25 gallons per thousand gallons to about 5 gallons per thousand gallons ("gpt") of clay stabilizing formulation. In another embodiment, the amount of stabilizer in the clay stabilizing formulation is at least 0.5 gallons per thousand gallons. In still another embodiment, the amount of clay stabilizing agent present in the clay stabilizing formulation ranges from about 0.05% to about 0.5% by volume of the clay stabilizing formulation.

When present, water used in the fluids of the present disclosure can be fresh water, salt water, or mixtures thereof. The term "salt water" is used herein to mean unsaturated salt water or saturated salt water including brines and seawater.

In another embodiment, the clay stabilizing formulation optionally contains one or more conventional additives. Examples of such additives include, but are not limited to, gelling materials, thinners, fluid loss control agents, encapsulating agents, bactericides, gel breakers, foaming agents, iron control agents, stabilizers, lubricants, penetration rate enhancers, defoamers, corrosion inhibitors, lost circulation fluids, anti-bit balling agents, neutralizing agents, pH buffering agents, surfactants, proppants, and sand for gravel packing.

Examples of gelling materials include, but are not limited to, bentonite, sepiolite clay, attapulgite clay, anionic high-molecular weight polymers and biopolymers.

Examples of thinners include, but are not limited to, lignosulfates, modified lignosulfates, polyphosphates, tannins, and low molecular weight polyacrylates.

Examples of fluid loss control agents include, but are not limited to, synthetic organic polymers, biopolymers and mixtures thereof, modified lignite polymers, modified starches and modified celluloses.

Examples of encapsulating agents include, but are not limited to, synthetic materials, organic materials, inorganic materials, biopolymers or mixtures thereof. The encapsulating agent may be anionic, cationic or non-ionic in nature.

The present disclosure will further be described by reference to the following examples. The following examples are merely illustrative and are not intended to be limiting. Unless otherwise indicated, all percentages are by weight of the total composition.

EXAMPLE 1

Capillary Suction Time (CST) Ratio Measurement

CST values for reference fluids and slurry mixtures were measured at least three times, and CST ratios ($CST_{slurry}/CST_{reference}$) were calculated using the average CST values. The measurement of CST ratio is beneficial to discount the liquid-only effects. A small CST ratio means less swelling has occurred and it directly depends on the performance of the clay stabilizer. Clay stabilizers exhibiting a CST ratio of less than 3.0 are preferred.

The Capillary Suction Time unit (OFITE 294-50) was prepared for each CST measurement by placing a grade 17 CHR cellulose chromatography paper on the lower plate and lowering the upper plate into position. A stainless steel funnel (diameter 1 cm) was placed into the hole in the center of the upper plate. The timer was reset to zero.

Reference liquids (100 mL) were prepared by combining deionized water and the following clay stabilizers:

TABLE 1

| Reference Liquid No. | Clay Stabilizer | Chemical Structure |
| --- | --- | --- |
| 1 | Betaine Methyl Ester Chloride | [structure of betaine methyl ester chloride] Cl⁻ |
| 2 | Betaine Ethyl Ester Chloride | [structure of betaine ethyl ester chloride] Cl⁻ |
| 3 | Betaine Aminoamide | [structure] Cl⁻ MW = 160 major; [structure] 2Cl⁻ MW = 260 minor |
| 4 | DETA Betaine HCl | [structure of DETA Betaine HCl] |
| 5 | TETA Betaine HCl | [structure of TETA Betaine HCl] |
| 6 | TEPA Betaine HCl | [structure of TEPA Betaine HCl] |

TABLE 1-continued

Reference liquids.

| Reference Liquid No. | Clay Stabilizer | Chemical Structure |
|---|---|---|
| 7 | DMAPA Betaine HCl | $H_3C-\overset{CH_3}{\underset{H_3C}{\overset{|}{N^{\oplus}}}}-\overset{H_2}{C}-\overset{O}{\underset{}{\overset{||}{C}}}-\overset{}{\underset{H}{N}}-\overset{H_2}{C}-\overset{H_2}{C}-N(CH_3)_2$ |

CST of each reference liquid was separately measured by delivering 3 mL of a reference liquid rapidly via pipet into the stainless steel funnel. As the liquid migrated away from the sample, it triggered the timer by electric contact with the inner ring. The liquid continued to migrate outward. The timer was automatically stopped when the liquid contacted the outer ring. The time, in seconds, was recorded for each sample, then the timer was cleaned and reset to zero. Samples were tested in triplicate and the times averaged ("$CST_{reference}$").

Slurry fluids were prepared by adding 5 grams of a rock powder sample (which contained 4.6 gram of silica sand and 0.4 grams of untreated bentonite) and 50 mL of a reference liquid to a 100 mL beaker. The slurry was shaken to mix and allowed to stand 60 minutes for equilibration.

CST of each slurry fluid was separately measured. The slurry was shaken and 3.2 mL was quickly poured into the funnel. The time was recorded for each sample. Samples were tested at least three times and the times averaged ("$CST_{slurry}$").

To compare the performance of betaine-based candidates, CST ratio of choline chloride and potassium chloride, which are common clay stabilizers, were also measured. 1 gram per thousand (gpt) choline chloride exhibited 2.44 CST ratio and 2% KCl exhibited 3.7 CST ratio. By comparison, 1 gpt betaine methyl ester chloride exhibited 1.21 CST ratio and amide and HCl versions also exhibited less than 2 which are smaller CST ratios than 1 gpt choline chloride and 2% KCl. Therefore, the betaine-based candidates exhibit better clay stabilizing performance than choline chloride and KCl. (FIG. 1).

Figure 2:
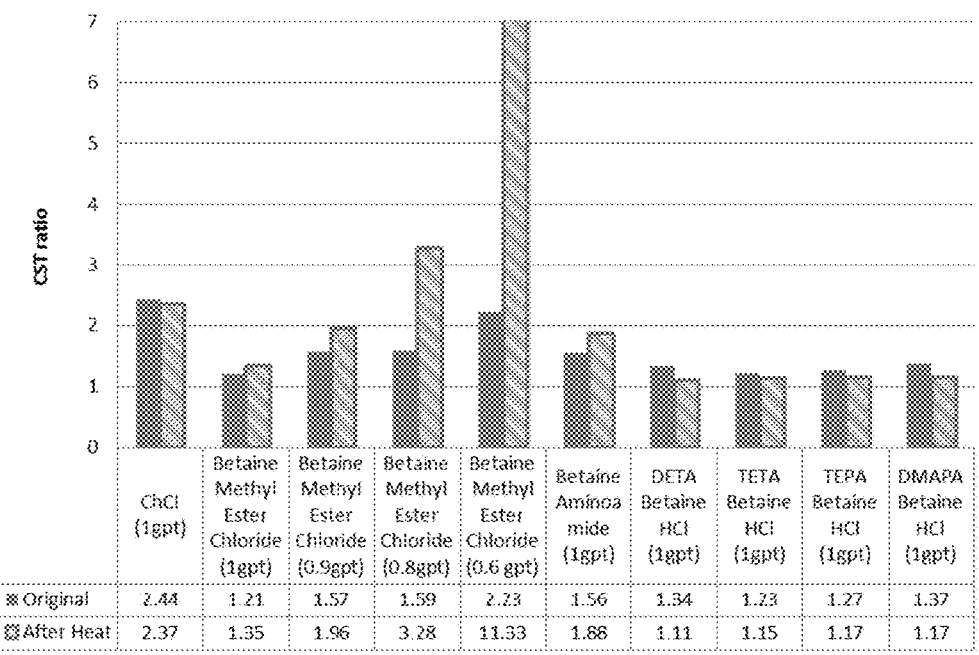
FIG. 2 provides a comparison of CST ratios prior to and after heating.

The effect of elevated temperature on clay stabilizing performance was also studied. The CST ratio was measured after the slurry was heated at 60° C. for 1 day. Choline chloride (1 gpt) exhibited a CST ratio of 2.37, which does not represent any change within the error range. While the CST ratio for betaine methyl ester chloride (0.9 gpt) increased to 1.96 after heat exposure, it is still within a preferred performance range (ratio lower than 3.0). (FIG. 2).

Figure 3:
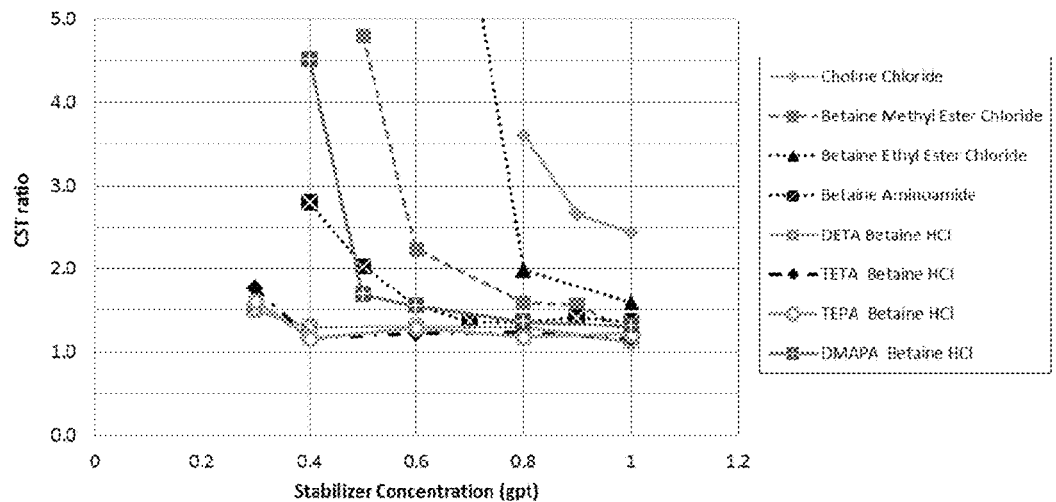
FIG. 3 is a study of the effect of stabilizer concentration on CST ratios.

The effect of clay stabilizer concentration was also studied. Slurries containing a betaine HCl clay stabilizer at 0.8 and 0.4 gpt were prepared and analyzed. Even at these lower loadings, all samples demonstrated a CST ratio of less than 3.0. (Table 2 and FIG. 3).

TABLE 2

Summary of CST ratio measurement.

| | Clay Stabilizer concentration | | | | | | | | |
|---|---|---|---|---|---|---|---|---|---|
| | 1 | 0.9 | 0.8 | 0.7 | 0.6 | 0.5 | 0.4 | 0.3 | Conditions |
| Choline Chloride | 2.44 | 2.66 | 3.61 | | | | | | |
| Betaine Methyl Ester Chloride | 1.21 | 1.57 | 1.59 | | 2.23 | 4.80 | | | |
| Betaine Ethyl Ester Chloride | 1.59 | | 1.98 | 5.89 | 10.19 | | | | |
| Betaine Amide | 1.35 | 1.74 | 2.40 | 4.14 | | | | | pH |
| Betaine Aminoamide | 1.36 | 1.41 | 1.36 | 1.36 | 1.56 | 2.02 | 2.80 | 6.48 | adjusted |
| DETA Betaine HCl | 1.12 | | 1.30 | | 1.31 | | 1.30 | 1.50 | around 4-6 |
| TETA Betaine HCl | 1.16 | | 1.23 | | 1.22 | | 1.16 | 1.77 | |
| TEPA Betaine HCl | 1.22 | | 1.18 | | 1.29 | | 1.16 | 1.61 | |
| DMAPA Betaine HCl | 1.31 | | 1.36 | | 1.55 | 1.69 | 4.51 | | |

EXAMPLE 2

Filtration Time Measurement

Clay stabilizer performance was also assessed by comparing the reduction of filtration time for slurry samples containing a clay stabilizer in deionized water with that of slurry samples containing deionized water and no clay stabilizer. Slurry samples were prepared by combining 5 grams of a rock powder sample (which contained 4.6 gram of silica sand and 0.4 grams of untreated bentonite) and 100 mL of water (with or without a clay stabilizer) in a Waring blender and mixing the combination at low speed for 5 minutes. The mixture was then passed through a Whatman #2 filter paper. Filtrate volume was recorded as a function of time.

Figure 4:
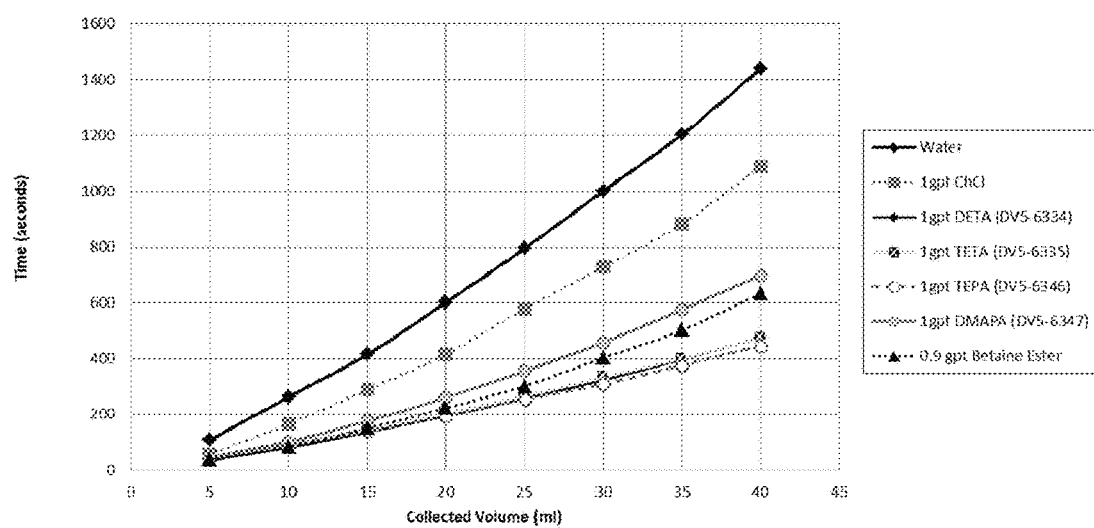
FIG. 4 is a filtration time measurement study.

As shown in FIG. 4, when compared with the slurry containing no clay stabilizer, the addition of choline chloride (1 gpt) to the slurry reduced filtration time by 25%. Surprisingly, when compared with the slurry containing no clay stabilizer, the addition of betaine methyl ester chloride (0.9 gpt) to the slurry reduced filtration time by 56%; the addition of DMAPA Betaine HCl (1 gpt) reduced filtration time by 52%; and the addition of DETA, TETA, TEPA Betaine HCl (all 1 gpt) reduced filtration time by 67%.

Based upon the above results, the betaine-based clay stabilizers of the present disclosure provide more effective clay stabilizing performance than choline chloride and potassium chloride.

The disclosed subject matter has been described with reference to specific details of particular embodiments thereof. It is not intended that such details be regarded as limitations upon the scope of the disclosed subject matter except insofar as and to the extent that they are included in the accompanying claims.

Therefore, the exemplary embodiments described herein are well adapted to attain the ends and advantages mentioned as well as those that are inherent therein. The particular embodiments disclosed above are illustrative only, as the exemplary embodiments described herein may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the exemplary embodiments described herein. The exemplary embodiments described herein illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components, substances and steps. As used herein the term "consisting essentially of" shall be construed to mean including the listed components, substances or steps and such additional components, substances or steps which do not materially affect the basic and novel properties of the composition or method. In some embodiments, a composition in accordance with embodiments of the present disclosure that "consists essentially of" the recited components or substances does not include any additional components or substances that alter the basic and novel properties of the composition. If there is any conflict in the usages of a word or term in this specification and one or more patent or other documents that may be incorporated herein by reference, the definitions that are consistent with this specification should be adopted.

We claim:

1. A method of inhibiting the swelling and/or migration of clay subterranean materials during drilling comprising drilling a borehole with a drilling fluid comprising a clay stabilizing agent selected from the group consisting of quaternary ammonium salts according to Formula II

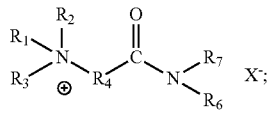

and combinations thereof, wherein for each Formula individually:

$R_1$, $R_2$ and $R_3$ are the same an alkyl group of from 1 to about 3 carbon atoms, $R_4$ is a saturated straight or branched alkyl group of from 1 to 3 carbon atoms, $R_6$ and $R_7$ are different and are hydrogen, polyamine, and $X^-$ is a monovalent inorganic anion or an organic carboxylic acid anion derived from a $C_{2-6}$ carboxylic acid; and combinations thereof.

2. The method of claim 1, wherein the clay subterranean materials are selected from the group consisting of montmorillonite, saponite, nontronite, hectorite, sauconite, kaolinite, nacrite, dickite, halloysite, hydrobiotite, gluaconite, illite, bramallite, chlorite, chamosite, vermiculite, attapulgite, sepiolite and combinations thereof.

3. The method of claim 1, wherein the drilling fluid further comprises one or more additives selected from the group consisting of bactericides, fluid loss control agents, and combinations thereof.

* * * * *